United States Patent [19]

Chonan

[11] Patent Number: 4,677,537
[45] Date of Patent: Jun. 30, 1987

[54] CONVERTER DEVICE

[75] Inventor: Katsuhiko Chonan, Nagoya, Japan

[73] Assignee: Mitsubishi Denki Kabushiki Kaisha, Japan

[21] Appl. No.: 841,228

[22] Filed: Mar. 19, 1986

[51] Int. Cl.[4] .............................................. H02M 7/06
[52] U.S. Cl. ...................................... 363/126; 363/89
[58] Field of Search ..................................... 363/52–53, 363/84, 89, 126; 323/266

[56] References Cited

U.S. PATENT DOCUMENTS

| 4,275,436 | 6/1981 | Peterson | 363/126 X |
| 4,302,806 | 11/1981 | Baker | 363/126 |
| 4,449,177 | 5/1984 | Kozai et al. | 363/126 |
| 4,499,533 | 2/1985 | Okamoto | 363/126 |
| 4,555,751 | 11/1985 | Koga et al. | 363/126 X |

FOREIGN PATENT DOCUMENTS 52-28216  7/1977  Japan.
54-21947  8/1979  Japan.
55-40637  3/1980  Japan.

Primary Examiner—Peter S. Wong
Attorney, Agent, or Firm—Leydig, Voit & Mayer

[57] ABSTRACT

In a converter device comprising smoothing capacitors 2a, 2b connected in series and disposed at a DC output side, a voltage unbalance is produced between these smoothing capacitors in accordance with a current flowing through a connecting point Q of the smoothing capacitors 2a, 2b. The current flowing through the connecting point is detected and in response thereto a dummy resistor 10 is selectively connected in parallel with the smoothing capacitor 2a at the side where the load is not connected, thereby effectively eliminating the voltage unbalance with less power loss.

2 Claims, 2 Drawing Figures

CONVERTER DEVICE

TECHNICAL FIELD

The present invention relates to a converter device comprising smoothing capacitors provided at the DC output side of a converter for converting AC power into DC power to feed a load with the DC power by using the smoothing capaciters as a DC power source.

TECHNICAL BACKGROUND OF THE INVENTION

A conventional converter device of this kind comprises a two capacitors connected in series as the smoothing capacitors due to the convenience of a rated voltage, one of which is connected with a load to become for instance a control power source. FIG. 2 is a circuit diagram showing the converter device in which reference numeral (1) designates a converter comprising for instance diodes for converting three phase AC power supplied from a commercial power source into a DC power, numerals (2a 2b) designate smoothing capacitors connected in series and provided at the DC output side of the converter (1), numeral (3) designates a first load being fed with the DC power by using the smoothing capacitors (2a), (2b) as the DC power source, numeral 4 designates a load connected in parallel with the smoothing capacitor (2b) to become for instance a control power source for a control circuit (not shown). Although the voltage of the two terminals P-N of the smoothing capacitors (2a, 2b) connected in series is 400V, the load (4) is fed with the voltage lower than 400V between the two terminals Q-N of the smoothing capacitor (2b).

However, if one of the two smoothing capacitors connected in series is connected to the load (4) to supply with a current Io thereto, the voltage between the terminals Q-N of the smoothing capacitor (2b) connected to the load (4) comes down, then the voltage between the terminals P-Q of the other smoothing capacitor (2a) comes up so much, thereby causing a voltage unbalance. The thus raised voltage becomes higher than the rated voltage of the smoothing capacitor (2a) to possibly damage the smoothing capacitor. Therefore the smoothing capacitors (2a, 2b) are connected respectively in parallel with dummy resistors (5a, 5b).

In the conventional converter device as stated above, the dummy resistors (5a, 5b) are constantly connected in parallel with the smoothing capacitors (2a, 2b) so that the currents $I_1$, $I_2$ flow through the dummy resitors (5a, 5b) thereby causing the power consummed by the dummy resistors to increase its loss.

DISCLOSURE OF THE INVENTION

The present invention has been made to eliminate the aforesaid problem and has for its object to provide a converter device capable of effectively eliminating the voltage unbalance with less power loss.

A converter device according to the present invention comprises two smoothing capacitors connected in series and disposed at the DC output side of the converter for converting AC power into DC power, a first load connected in parallel with the two smoothing capacitors connected in series, a second load connected in parallel with any one of the smoothing capacitors and a voltage balance circuit for connecting a dummy resistor in parallel with the smoothing capacitors at the side where the second load is not connected in accordance with the detection of a current flowing through the connecting point of the two smoothing capacitors connected in series.

In the present invention, when the current flowing through the connecting point of the two smoothing capacitors connected in series is less or zero, the dummy resistor is disconnected from the circuit. And when the current flowing through the connecting point by the supply of the second load with the current, the dummy resister is connected in parallel with the smoothing capacitor to which the second load is not connected by detecting the increase in the current. The current is controlled such that the load resistors of the smoothing capacitors connected in series become equal, that is, such that the load currents of both smoothing capacitors become equal. Therefore, the voltage balance circuit eliminates the voltage unbalance between the terminals of the smoothing capacitors connected in series with less power loss.

BRIEF DESCRIPTION OF THE DRAWINGS

FIG. 1 is a circuit diagram showing one embodiment according to the present invention. Reference numerals (1 to 4) designate the same parts as those of the conventional converter device. Numeral (6) designates a current detector disposed at the connecting path between the connecting point Q of the smoothing capacitors (2a, 2b) and the second load (4). Numeral (7) designates a current-to-voltage converter for converting the current detected by the current detector (6) into a voltage. Numeral (8) designates a voltage comparator which is fed one input thereof with the output voltage of the current-to-voltage converter (7). Numeral (9) designates a transistor as a switching element receiving the output of the voltage comparator (8) to conduct for connecting a dummy resistor (10) in parallel with the smoothing capacitor (2a) to which the second load (4) is not connected. Numeral 11 designates a voltage balance circuit comprising the current detector 6, the current-to-voltage converter (7), the voltage comparator (8), the transistor (9) and the dummy resistor (10).

Figure 1:
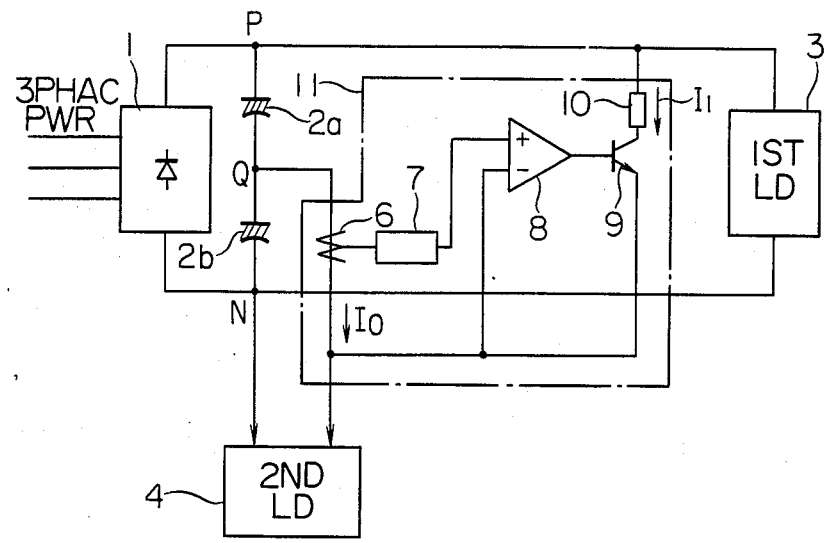
FIG. 1 is a circuit diagram showing one embodiment according to the present invention.
Figure 2:
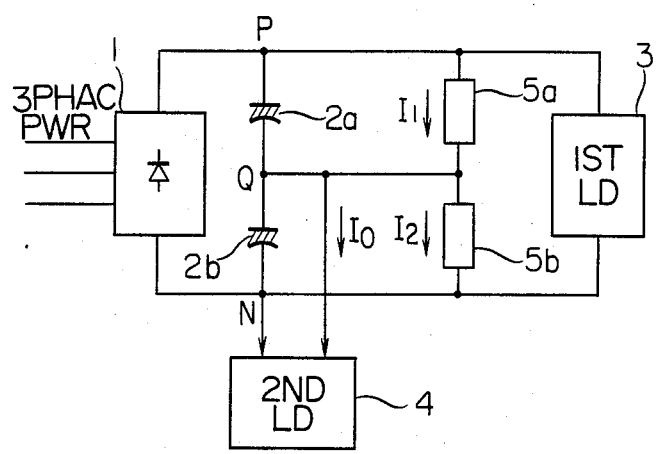
FIG. 2 is a circuit diagram showing a conventional converter device.

In the converter device having such a construction, for example, when the second load (4) is fed to increase the current Io from the connecting point Q of the smoothing capacitors (2a, 2b) and the output voltage of the current-to-voltage converter (7) increases in accordance with the detected current of the current detector (6), the voltage comparator (8) produces the output. The output drives the transistor (9) to conduct for connecting the dummy resistor (10) in parallel with the smoothing capacitor (2a) to which the second load (4) is not connected through the transistor. In this manner, the current flowing through the connecting point Q is controlled to become constantly zero such that the load resistances of the smoothing capacitors (2a, 2b) connected in series become equal, that is, such that the load current of the both smoothing capacitors become equal.

Thus, the converter device according to the present invention detects the occurrence of the voltage unbalance of the terminals of the smoothing capacitors in accordance with the current flowing through the connecting point of the smoothing capacitors connected in series and in response thereto selectively connects the dummy resistor in parallel with the smoothing capacitor at the side where the load is not connected, resulting in effectively eliminating the voltage unbalance with less power loss.

What is claimed is:

1. A converter device comprising: a converter for converting AC power into DC power and having a pair of DC output terminals conveying said DC power; two smoothing capacitors connected in series across said DC output terminals; a first load connected across said DC output terminals; a second load connected in parallel with a first one of the smoothing capacitors, the smoothing capacitors and the second load being interconnected at a common connecting point; and a voltage balance circuit having a pair of load terminals connected in parallel with the second one of said smoothing capacitors, said voltage balance circuit including means for detecting a current flowing through said common connecting point and means for selectively applying a dummy load to said load terminals in response to the detected current.

2. The converter device as defined in claim 1 wherein said means for detecting the current flowing through the common connecting point includes a current-to-voltage converter for providing an output voltage indicating the detected current, and wherein said means for selectively applying a dummy load comprises a voltage comparator for comparing the output voltage of the current-to-voltage converter with a reference voltage, a dummy resistor, and a switching element driven by the output of the voltage comparator for selectively connecting the duumy resistor to said load terminals.

* * * * *